United States Patent
Lynch et al.

(10) Patent No.: US 8,265,167 B2
(45) Date of Patent: Sep. 11, 2012

(54) APPLICATION SPECIFIC VIDEO FORMAT

(75) Inventors: John David Lynch, Olathe, KS (US);
Eric Eugene Miller, Olathe, KS (US);
Charles Daniel Todd, Parkville, MO
(US); Monika Kishor Panpaliya,
Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 982 days.

(21) Appl. No.: 12/262,423

(22) Filed: Oct. 31, 2008

(65) Prior Publication Data
US 2010/0111196 A1 May 6, 2010

(51) Int. Cl.
*H04N 7/12* (2006.01)
(52) U.S. Cl. .......... 375/240.25; 375/240.26; 375/240.09
(58) Field of Classification Search ..................... None
See application file for complete search history.

(56) References Cited

U.S. PATENT DOCUMENTS

| | | | |
|---|---|---|---|
| 6,141,442 A | 10/2000 | Chen | |
| 7,760,660 B2 * | 7/2010 | Conway | 375/240.27 |
| 2007/0183661 A1 | 8/2007 | El-Maleh et al. | |
| 2008/0259154 A1 | 10/2008 | Garrison et al. | |
| 2011/0310964 A1 * | 12/2011 | Beymer et al. | 375/240.08 |
| 2012/0020407 A1 * | 1/2012 | Liu et al. | 375/240.01 |
| 2012/0027079 A1 * | 2/2012 | Ye et al. | 375/240.02 |
| 2012/0027080 A1 * | 2/2012 | Yang | 375/240.03 |
| 2012/0033730 A1 * | 2/2012 | Lee | 375/240.12 |

OTHER PUBLICATIONS

Larry Greenemeier, "Easy Cell: Mobile Phones for the Hearing Impaired," Sep. 4, 2008, Scientific American, 2 pp. Website: http://www.sciam.com/article.cfm?id=cell-phone-sign-language.
PCT International Search Report and Written Opinion of the International Searching Authority, or the Declaration, mailed Apr. 2, 2010 regarding International Application No. PCT/US2009/062790 16 pages.
Chen, et al., "Coding of Subregions for Content-Based Scalable Video" IEEE Transcations on Circuits and Systems for Video Technology, vol. 7, No. 1, Feb. 1, 1997, pp. 256-260.
Haralick et al., "SURVEY: Image Segmentation Techniques" Computer Vision Graphics and Image Processing, vol. 29, No. 1, Jan. 1, 1985, pp. 100-132.
Hjelmas, "Face Detection: A Survey" Computer Vision and Image Understanding, vol. 83, No. 3, Sep. 1, 2001, pp. 236-274.
Ladner "Mobile ASL: Making Cell Phones Accessible to the Deaf Community," University of Washington, 2007 7 pp. website: www.washiington.edu/accesscomputing.
Ciaramello, et al., "Complexity constrained rate-distortion optimization of sign language video using an objective intelligibility metric," School of Electrical and Computer Engineering, Cornell University, Ithaca, NY, 14853, 2007, 4 pp., fmc3@cornell.edu, hemami@ece.cornell.edu.

(Continued)

*Primary Examiner* — David Y Jung (57) ABSTRACT

A method, system, and medium are provided for formatting video frames such that a region of interest is emphasized and the video frames can be encoded, communicated, and rendered without excessive processing burdens. A region of interest is identified in a video frame and a feature mask is created that represents the region of interest. The feature mask can be used to crop the video frame to remove background images that are not within the region of interest and the cropped video frame can be overlayed on a simulated background before being encoded and communicated to a display device.

20 Claims, 8 Drawing Sheets

OTHER PUBLICATIONS

Ciaramello, et al., "Can You See me Now?" An Objective Metric for Predicting Intelligibility of Compressed American Sign Language Video; Visual Communication Laboratory, School of Electrical and Computer Engineering, Cornell University, Ithaca, NY, 14853; 2007, 4 pp., fmc3@cornell.edu, hemami@ece.cornell.edu.

Ladner, et al., "Mobile ASL: Intelligibility of Sign Language as Constrained by Mobile Phone Technology," University of Washington; Cornell University, 2007, 14 pp., www.washiington.edu/accesscomputing.

Cherniavsky, et al. "Variable Frame Rate for Low Power Mobile Sign Language Communication," Dept. of Computer Science & Engineering; University of Washington, Oct. 15, 2007, 8 pp., nchernia@cs.washington.edu.

Muir, "Content-Prioritised Video Coding for British Sign Language Communication," Thesis paper, The Robert Gordon University, Oct. 2007, 289 pp.

* cited by examiner

| 1,10 | 2,10 | 3,10 | 4,10 | 5,10 | 6,10 | 7,10 | 8,10 | 9,10 | 10,10 |
|---|---|---|---|---|---|---|---|---|---|
| 1,9 | 2,9 | 3,9 | 4,9 | 5,9 | 6,9 | 7,9 | 8,9 | 9,9 | 10,9 |
| 1,8 | 2,8 | 3,8 | 4,8 | 5,8 | 6,8 | 7,8 | 8,8 | 9,8 | 10,8 |
| 1,7 | 2,7 | 3,7 | 4,7 | 5,7 | 6,7 | 7,7 | 8,7 | 9,7 | 10,7 |
| 1,6 | 2,6 | 3,6 | 4,6 | 5,6 | 6,6 | 7,6 | 8,6 | 9,6 | 10,6 |
| 1,5 | 2,5 | 3,5 | 4,5 | 5,5 | 6,5 | 7,5 | 8,5 | 9,5 | 10,5 |
| 1,4 | 2,4 | 3,4 | 4,4 | 5,4 | 6,4 | 7,4 | 8,4 | 9,4 | 10,4 |
| 1,3 | 2,3 | 3,3 | 4,3 | 5,3 | 6,3 | 7,3 | 8,3 | 9,3 | 10,3 |
| 1,2 | 2,2 | 3,2 | 4,2 | 5,2 | 6,2 | 7,2 | 8,2 | 9,2 | 10,2 |
| 1,1 | 2,1 | 3,1 | 4,1 | 5,1 | 6,1 | 7,1 | 8,1 | 9,1 | 10,1 |

APPLICATION SPECIFIC VIDEO FORMAT

SUMMARY

Embodiments of the invention are defined by the claims below, not this summary. A high-level overview of embodiments of the invention are provided here for that reason, to provide an overview of the disclosure.

In a first illustrative aspect, a set of computer-useable instructions provides a method for providing a formatted video stream that emphasizes a region of interest. According to an embodiment of the method, a video stream comprising a plurality of video frames is received and a region of interest is identified. Embodiments of the illustrative method include formatting the video frames to create formatted video frames that include the region of interest and a simulated background. The formatted video frames can be compressed and communicated to a display device.

In a second illustrative aspect, a set of computer-useable instructions provides a method for formatting a video stream to isolate features. In an embodiment, the method includes receiving a video frame and identifying a region of interest that corresponds to one or more features. Embodiments of the method further include creating a feature mask of the region of interest and using the feature mask to crop the video frame such that the cropped video frame includes only the region of interest. The cropped video frame can be overlayed on a simulated background to create a formatted video frame.

In another illustrative aspect, a system for formatting a video stream to isolate features is provided. Embodiments of the illustrative system include a video driver for receiving video frames from a video capturing device, a video formatting component that creates formatted frames that include a region of interest overlayed on a simulated background, and a video codec for compressing the formatted video frames.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for providing formatted video frames having a cropped region of interest overlayed on a simulated background. By cropping a region of interest and overlaying it on a simulated background, embodiments of the present invention facilitate effective video communication experiences that can be compressed, decompressed, and communicated efficiently.

Throughout the description of the present invention, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
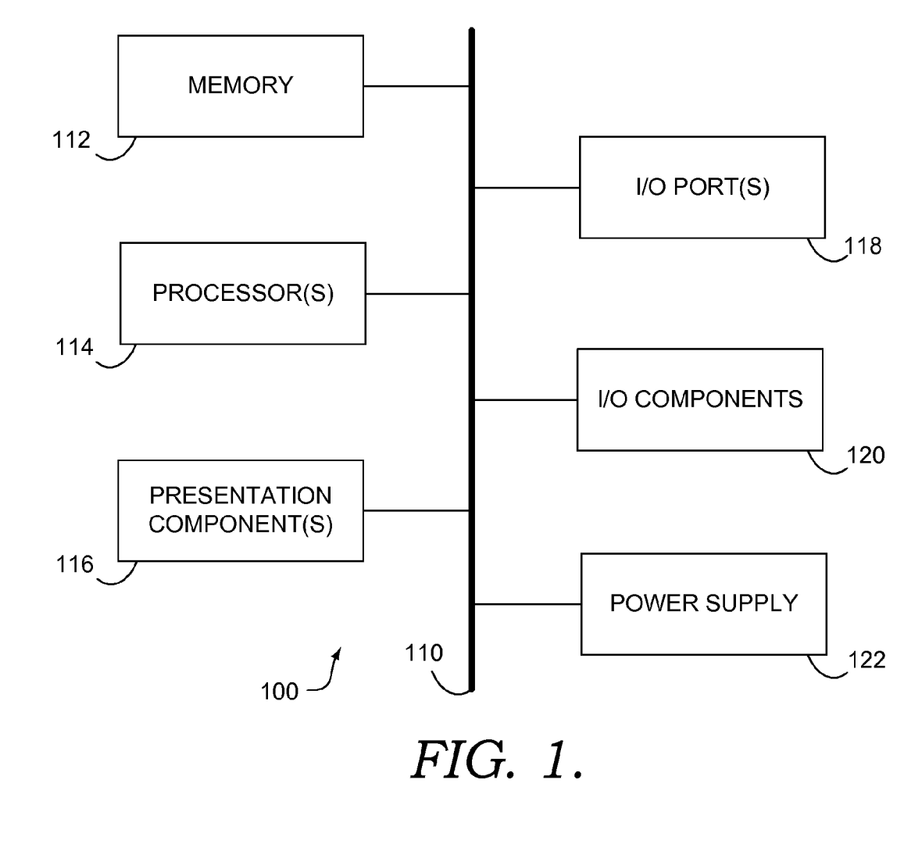
FIG. 1 is a block diagram showing an illustrative computing device in accordance with an embodiment of the present invention.

An exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

Computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," "cellular phone," mobile communications device, etc., as all are contemplated within the scope of FIG. 1 and reference to "computing device."

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, etc.

I/O ports 118 allow computing device 100 to be logically coupled to other devices including I/O components 120, some of which may be built in. Illustrative components include a microphone, joystick, game pad, satellite dish, scanner, printer, wireless device, keyboard, pen, voice input device, video input device, touch input device, touch-screen device, interactive display device, or a mouse.

Figure 2:
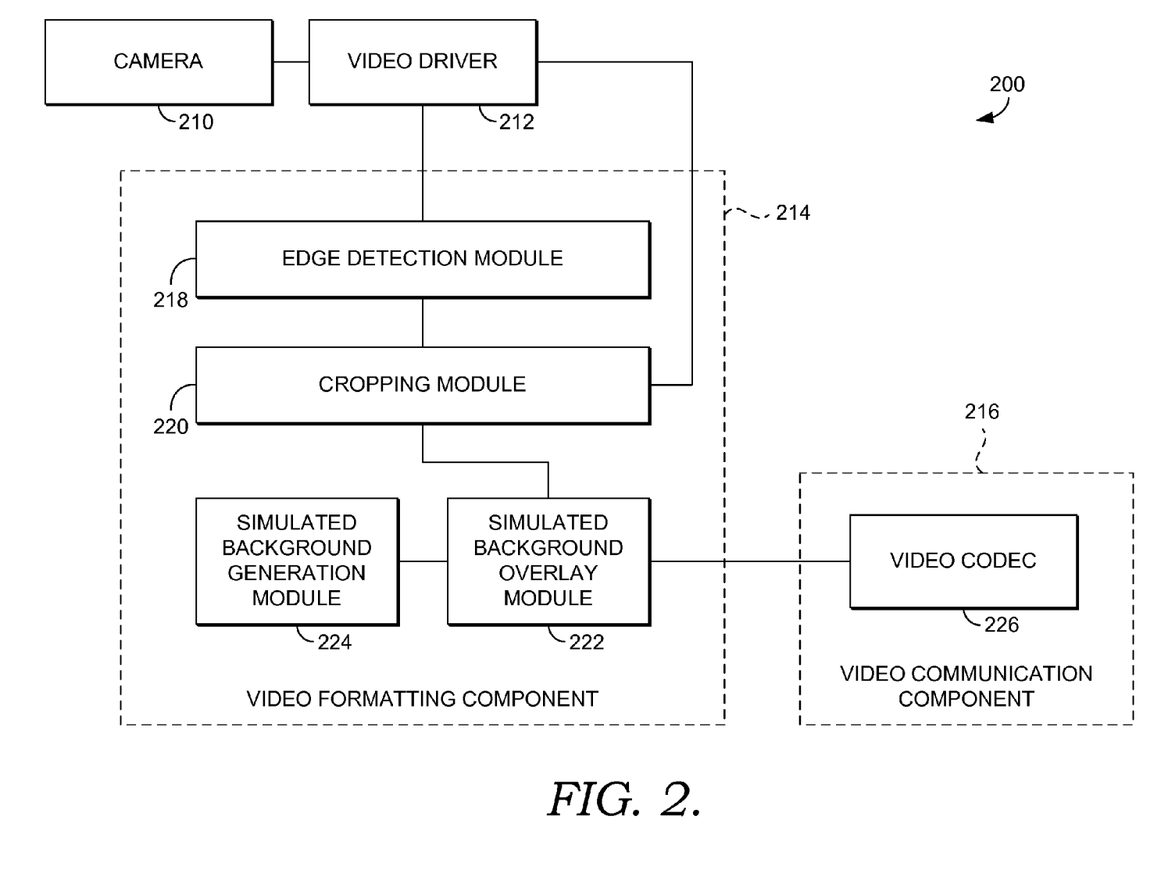
FIG. 2 is a block diagram showing an illustrative video processing system suitable for implementing an embodiment of the present invention.

Turning to FIG. 2, an illustrative video processing system 200 suitable for implementing an embodiment of the present invention is shown. Video processing system 200 includes a camera 210, a video driver 212, a video formatting component 214, and a video communication component 216. Camera 210 can be any kind of video capture device that is capable of capturing moving images and generating video data therefrom, according to various embodiments of the present invention. Video driver 212 interprets output from camera 210 to generate video frames, which are then sent to video formatting component 210. Video formatting component formats the video frames such that the formatted frames include a region of interest and a simulated background. The formatted videos can be communicated to video communication component 216, which includes a video codec 226 that encodes the formatted video frames before communicating them to another device. Video codec 226 can include any type of suitable compression software that generates compressed video frames such as, for example, according to an MPEG standard. Additionally, in some embodiments, video codec 226 can provide an indication to a video decoder (i.e., codec) located on a communications device not illustrated in FIG. 2. In embodiments, the indication can alert the decoder of the standard used for encoding the video such that the decoder can be appropriately configured for decoding the encoded formatted video frames. For instance, video codec 226 can indicate, as an example, that the formatted video frames are encoded according to an H.264 standard. As another example, video codec 226 can indicate which pixels of each frame have been encoded, as explained more fully below.

Video processing system 200 is merely an example of one suitable video processing system and is not intended to suggest any limitation as to the scope of use or functionality of the present invention. Neither should video processing system 200 be interpreted as having any dependency or requirement related to any single component or combination of components illustrated therein.

Video formatting component 210 includes an edge detection module 218, a cropping module 220, a simulated-background overlay module 222, and a simulated-background generation module 224. In some embodiments, video formatting component 214 can include other modules not illustrated in FIG. 1. For example, video formatting component 214 can include audio processing modules, audio/video mixing modules, video smoothing modules, and the like. In an embodiment, video formatting component 214 includes a color processing module that is capable of modifying color data such as, for example, by formatting video frames such that they can be rendered in black and white. In other embodiments, video formatting component 214 includes color correction modules, exposure correction modules, and the like.

According to embodiments of the present invention, video formatting component 214 receives video frames from video driver 212. In an embodiment, the video frames are represented by raw video image data. Video formatting component 214 formats the video frames such that the formatted video frames include a region of interest overlayed on a simulated background. According to embodiments of the present invention, the simulated background can be identical for each video frame in a presentation or communication. In this way, processing power required for encoding the video frames can be reduced since the background can be encoded as a key frame and only the motion within the region of interest needs to be encoded in predictive frames. Additionally, the use of simple, solid colors with minimal gradients between colors can further facilitate minimizing processing burdens.

With continued reference to FIG. 2, video formatting component 214 includes edge detection module 218. Edge detection module 218 analyzes each video frame received from video driver 212 and identifies a region of interest in each video frame. In embodiments, the region of interest includes a region of a video frame that includes a feature or features of interest. For example, in an embodiment, a sequence of video frames can be received from video driver 212, where the sequence of video frames constitutes a video recording of a user performing sign language according to the American Sign Language convention. Accordingly, a region of interest can be the region of each video frame that includes the user's hands and face. It will be appreciated by those of ordinary skill in the art that regions of interest can be defined in a number of different ways, and that different edge detection techniques and the like may provide varying results. All of these techniques and processes that can identify a region of interest within a video frame can include the region of the frame are considered to be within the ambit of the present invention.

In some embodiments, edge detection module 218 can include contextual edge detectors which receive user input that provides information about a definition of a region of interest. For example, in one embodiment, a user may interact with a touch-screen display to specify a region of interest by touching locations along the border of the desired region of interest. In other embodiments, edge detection module 218 can reference some software module, program, application, algorithm or the like to obtain information regarding a definition of a region of interest. These types of inputs will be generically referred to herein as region of interest definition logic. In other embodiments, edge detection module 218 includes autonomous edge detectors, which approach the process of edge-detecting without any a priori knowledge about the image.

In still further embodiments, a combination of autonomous and contextual edge detectors can be utilized within edge detection module 218. For example, in one embodiment, autonomous edge detectors can be used to analyze a first frame or several frames of a video frame sequence. Data representing the resulting edges can be stored and used by contextual edge detectors to decode subsequent frames. In an embodiment, a user may be presented with options that enable the user to guide the edge detection module 218 in its identification of the region of interest. One the region of interest is established for a frame or several frames, contextual edge detectors can be used to identify similar features (e.g., edges) in subsequent frames. This configuration may, in some embodiments, allow for the process to be run with less processing burden, which may facilitate a faster and more robust edge detection process.

With continued reference to FIG. 2, edge detection module 218 generates a feature mask based on the identified region of interest. In embodiments, an identified region of interest can be specified by a region of interest (R.O.I.) definition. An R.O.I. definition, as used herein, can include a set of pixel identifiers, each of which identifies a pixel in the video frame that is included within the region of interest. In other embodiments, an R.O.I. definition can include a definition of a curve that edge detection module 218 has fitted along the border of the R.O.I. In further embodiments, R.O.I. definitions can be represented in a number of other ways, each of which is intended to be within the scope of the present invention. Edge detection module 218 can use any number of edge detection techniques and can include smoothing filters, various differentiation operators, and labeling processes. For instance, in an embodiment, a video frame can be smoothed by a Gaussian kernel in a scale-space representation before the R.O.I. is detected. In some embodiments, edge detection module 218 can include various types of edge detectors such as step edge detectors, line edge detectors, junction detectors, multi-scale edge detectors, phase information extractors, various filters, and the like. In other embodiments, edge detection module 218 can include other feature detection methods such as interest point detection, corner detection, blob detection, ridge detection, and the like.

Edge detection module 218 generates a feature mask by identifying the border of the R.O.I. For instance, if the R.O.I. definition includes a listing of pixels, edge detection module 218 can fit a curve to the video frame along an outer edge of the pixels included within the R.O.I. In other embodiments, edge detection module 218 can identify the border of the R.O.I. by referencing the R.O.I. definition. As used herein, the term feature mask generally refers to a solid outline of the R.O.I. The feature mask can be extracted from a video frame and, in some embodiments, can be abstracted from the video data to conserve processing power and time. Edge detection module 218 provides the feature mask to cropping module 220, included in video formatting component 214.

Cropping module 220 receives the feature mask from edge detection module 218 and uses the feature mask to crop the background out of the video frame. As used herein, the term "background" refers to any pixel within a video frame that is not within the R.O.I. Therefore, it should be apparent that, although a video recording may include, for example, a person and a dog in what is traditionally referred to as the foreground (e.g., the person and the dog are in focus), if an R.O.I. is defined that includes the person but not the dog, then, within the context of this application, the background would include the dog and everything else not within the region of interest. To crop a video frame, the cropping module 220 receives the video frame from video driver 212 and superimposes the feature mask on the video frame and removes any pixels not included within the region of interest identified by the feature mask.

It should be understood by those of ordinary skill in the art that superimposing a feature mask on a video frame can include a comparison of video data, an extraction of pixel identifiers according to an algorithm, or any other method of interpreting the R.O.I. identified by the feature mask in the context of the video frame. For example, where a feature mask is a listing of pixels included within the R.O.I., superimposing the feature mask on the video frame can include marking, tagging, or otherwise identifying either the pixels that will be kept (i.e., those pixels that are within the R.O.I.) or the pixels that will be removed (i.e., the background pixels—those pixels that are not within the R.O.I.). In other embodiments, superimposing a feature mask on a video frame can include applying a curve that defines a border of the R.O.I. to the video data that represents the video frame, thereby identifying which pixels or area of the video frame are within the R.O.I. In any case, superimposing a feature mask on a video frame should allow cropping module 220 to identify the portions of the video frame that are to be cropped.

Cropping module 220 generates a cropped video frame by removing background pixels from the video frame received from video driver 212. Accordingly, the cropped video frame includes only the region of interest, with no background data. This cropped video frame is provided to a simulated background overlay module 222. Simulated background overlay module 222 receives a simulated background from simulated background generation module 224 and overlays the cropped video frame on the simulated background. In embodiments, overlaying the cropped video frame on the simulated background can include filling in the spaces where background pixels were removed with pixels generated by the simulated background generation module 224.

It should be apparent that the cropped video frame, because it includes only the region of interest, will typically not include as many total pixels as the video frame originally contained. Because many standard codecs and applications are configured for handling video frames with a certain number of pixels (e.g., video frames that conform to a particular type of format), overlaying the cropped video frame on a simulated background restores the video frame to its original "size" (i.e., the original number of pixels), and thus can be more easily handled by other software and hardware modules. Additionally, it may be desirable to superimpose a region of interest on a simulated background for other reasons. For example, a simulated background can include any type of image, and thus, a user can overlay a video of himself on, say, a picture of a South American beach or a Rocky Mountain lakeshore.

In some embodiments, utilizing a simulated background can save processing power because simpler background images with limited color variance can be utilized, which are less computationally intensive to encode than are more natural or colorful images. For example, substantial processing power (and thus time) can be saved in some embodiments by using a solid color as the simulated background. With no fluctuations in color, encoding the background would be rather straightforward and not very processing-intensive when encoded by many types of standard encoders. Using solid color backgrounds can be especially advantageous for hearing-impaired users. For example, it has been found that an optimal background color for providing contrast to a region of interest containing a person utilizing sign language is blue. Thus, a solid blue simulated background could be used, for example, with video communications between hearing-impaired users. Of course, any other color could be used as well, and backgrounds of multiple colors can also be used. The more colors that are used, however, may increase the processing power and time associated with encoding the video frames.

In other embodiments, video formatting component 214 does not include simulated background overlay module 222. In further embodiments, video formatting component 214 does include simulated background overlay module 222 but may include an option for a user to elect to not utilize a simulated background. In these and other similar instances, a final formatted video frame can include a cropped video frame as generated by cropping module 220. In this case, video codec 226 can communicate, via video communication component 216, with a decoder to inform the decoder of the encoding format used to encode the cropped video frames as well as to inform the decoder about which pixels will be encoded and sent. Accordingly, the decoder can be configured to know how the encoding standard has been varied (i.e., by removing pixels during the cropping phase), and can be adjusted accordingly so that it can decode the data to render the cropped video frame.

With continued reference to FIG. 2, video communication component 216 can include hardware, software, firmware, and the like and generally allows for video frames (e.g., encoded video frames) to be communicated to other devices. Accordingly, in some embodiments, video communication component 216 includes video conferencing software. In another embodiment, video communication component 216 includes network access software modules. In further embodiments, video communication component 216 can include applications, APIs, plug-ins, add-ins, scripts, and the like.

Figure 3:
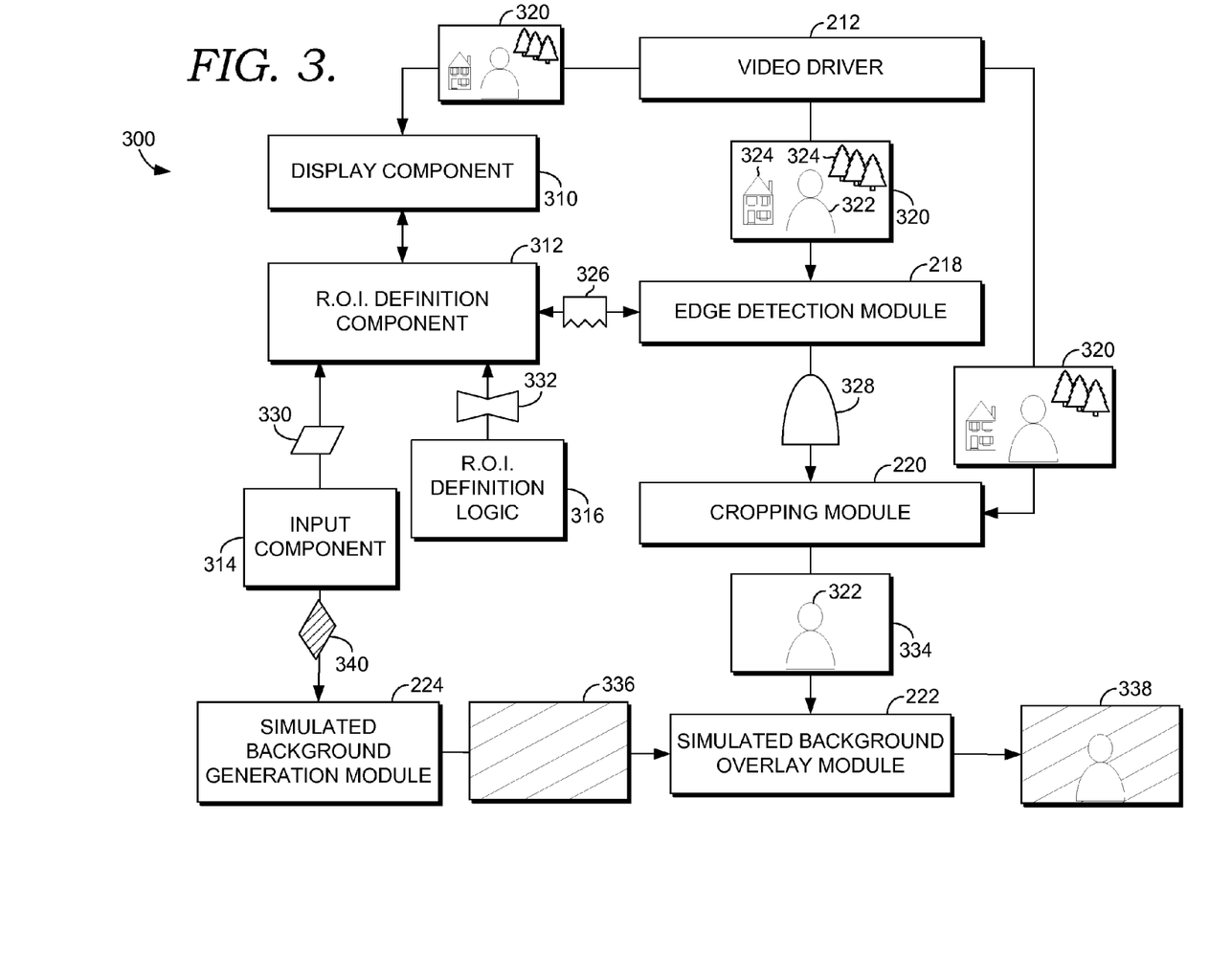
FIG. 3 is a schematic diagram showing an illustrative video formatting process in accordance with an embodiment of the present invention.

Turning now to FIG. 3, a schematic diagram is shown illustrating an exemplary video processing system 300 in operation, in accordance with an embodiment of the present invention. Video processing system 300 includes video driver 212, edge detection module 218, cropping module 220, simulated background overlay module 222, simulated background generation module 224, display component 310, R.O.I. definition component 312, input component 314, and R.O.I. definition logic 316. Video processing system 300 is merely an example of one suitable video processing system and is not intended to suggest any limitation as to the scope of use or functionality of the present invention. Neither should video processing system 300 be interpreted as having any dependency or requirement related to any single component or combination of components illustrated therein.

As illustrated in FIG. 3, video driver 212 provides a video frame 320 to edge detection module 218. Video driver 212 can also provide a copy of the video frame 320 to display component 310 such that the image can be displayed to a user. As illustrated, video frame 320 includes, for example, an image of the user 322 and images of background objects 324. Edge detection module 218 can identify a region of interest (R.O.I.) by analyzing video frame 320. In an embodiment, edge detection module 218 can use edge or feature detection methods to identify features within video frame 320. R.O.I. definition logic 316 can be interpreted by R.O.I. definition component 312 to provide edge detection module 218 with parameters 326 that facilitate identification of the types of detected features and edges that likely represent a desired R.O.I. Alternatively, the user can establish parameters 326, for example, by providing a first user input 330 via input component 314. In one embodiment, for example, display component 310 can be a touch-screen display device and can display an image of video frame 320. In an embodiment, the user can touch various regions on the touch-screen device to indicate the edges of a particular feature (e.g., the image of the user 322) that the user wishes to be included within the R.O.I. The first user input 330 can be interpreted by R.O.I. definition component 312 and provided, as a set of parameters 326, to edge detection module 218.

By referencing parameters 326 and analyzing video frame 320, edge detection module can identify an R.O.I. corresponding to video frame 320. Edge detection module 218 creates a feature mask 328 based on the identified R.O.I. As shown in FIG. 3, the feature mask is provided to cropping module 220, which also receives a copy of video frame 320 from video driver 212. Cropping module 220 overlays feature mask 328 on video frame 320 to identify the pixels that are to be removed from video frame 320. Accordingly, cropping module 220 removes all of the pixels that are not located within the R.O.I. (e.g., that are outside the border defined by feature mask 328) to generate a cropped video frame 334. Cropping module provides cropped video frame 334 to simulated background overlay module 222.

Simulated background overlay module 222 receives a simulated background 336 from simulated background generation module 224 and overlays cropped video frame 334 onto simulated background 336 to produce a formatted video frame 338 that includes the R.O.I. and the simulated background 336. As discussed above, simulated background 336 can include any kind of image, and in embodiments, can include a single solid color such as blue. In some embodiments, simulated background 336 can be defined by a user. A user can input a simulated background selection or definition 340 via input component 314 and simulated background generation module 224 can use that selection or definition 340 to generate simulated background 336. In other embodiments, simulated background 336 can be automatically selected by simulated background generation component 224 according to rules, configuration settings, preferences, contrast analysis, and the like.

Figure 4:
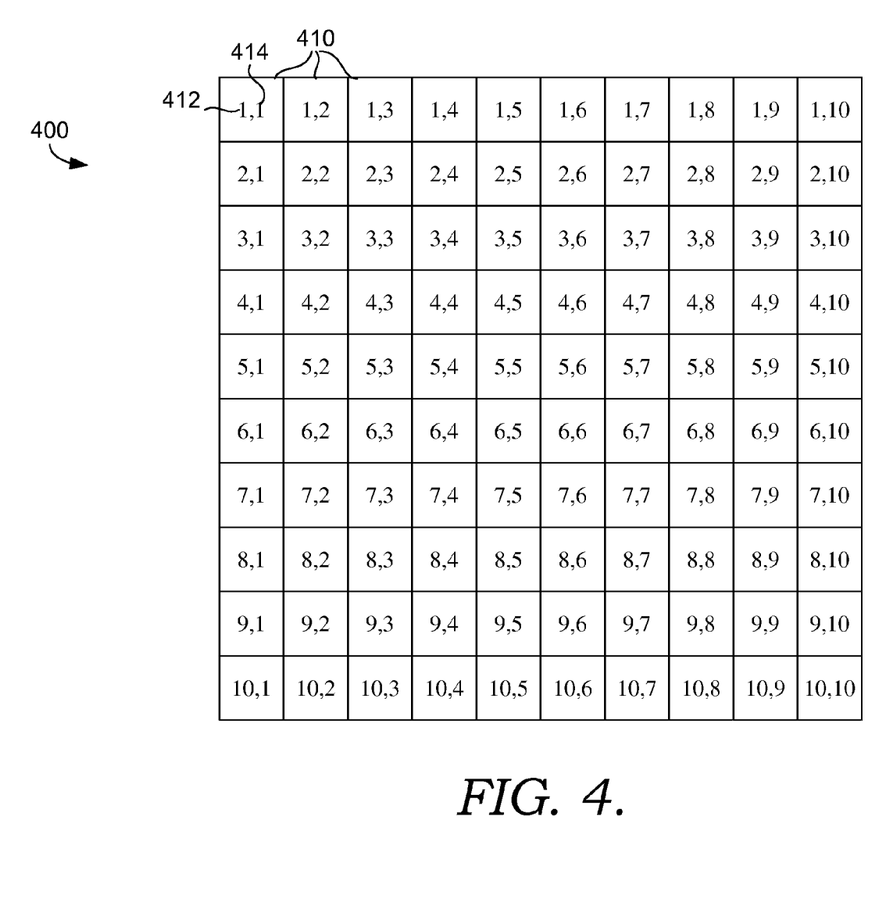
FIGS. 4-6 depict an exemplary video frame at various stages in an illustrative video formatting process in accordance with an embodiment of the present invention.
Figure 5:
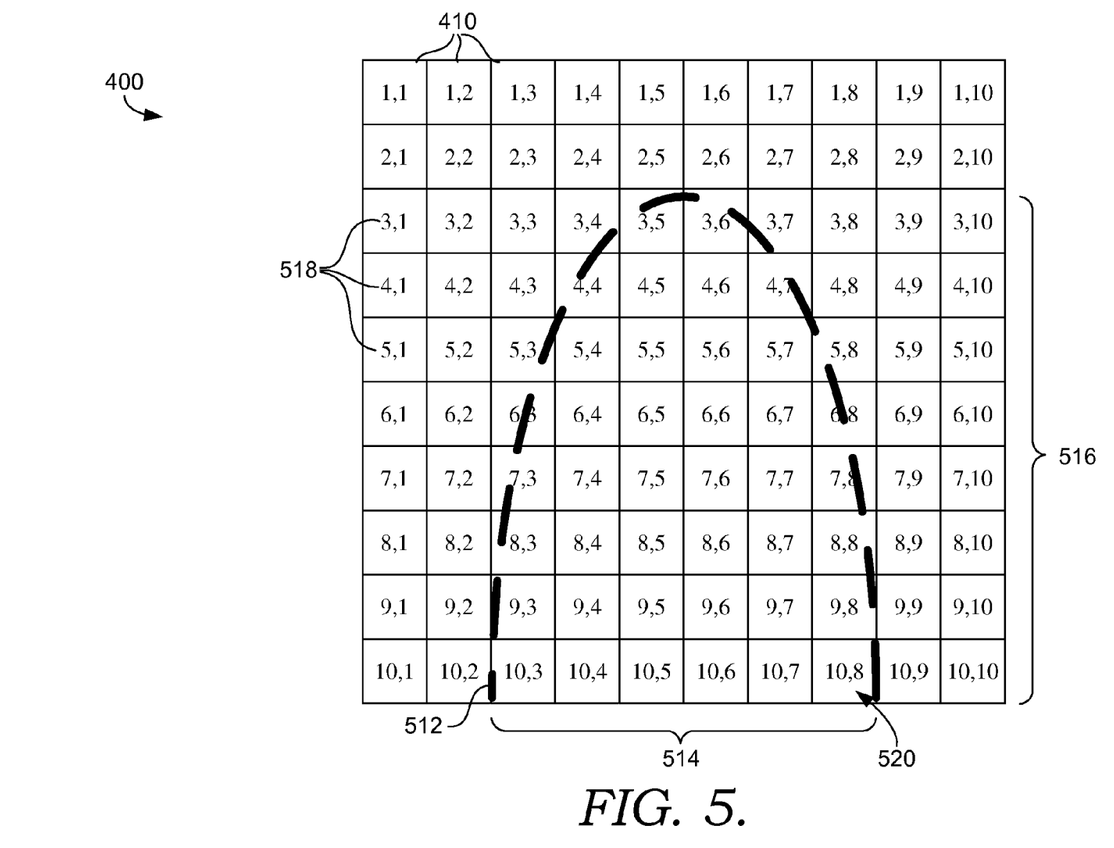
Figure 6:
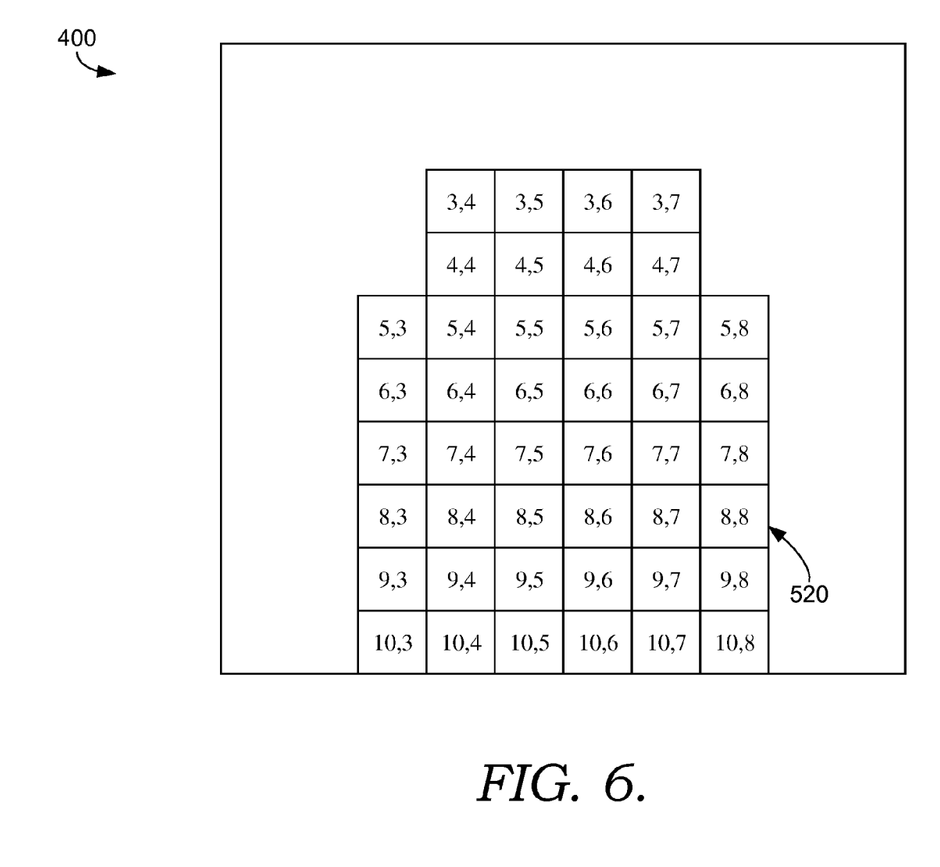

Turning to FIGS. 4-6, an exemplary video frame 400 at various stages in an illustrative video formatting process in accordance with an embodiment of the present invention is shown. With reference to FIG. 4, an exemplary representation of a video frame 400 is illustrated. The video frame 400 depicted in FIG. 4 does not show an image captured therein, but rather illustrates an illustrative identification scheme for the pixels 410 that constitute the video frame 400. Video frame 400 includes 100 pixels, arranged in a 10×10 format and is intended to be an illustrative representation of a pixel layout of a video frame. Of course, a video frame typically includes a much larger number of pixels (i.e., higher resolution), but for brevity and clarity of explanation, video frame 400 is shown with only 100 pixels. Additionally, video frames typically have aspect ratios different than the 1:1 aspect ratio illustrated in FIGS. 4-6 for clarity. Examples of illustrative aspect ratios of video frames include 4:3, 16:9, 2:1, and the like. Examples of illustrative resolutions of video frames can include 768×576, 640×480, 320×240, 160×120, and the like. Any of the various possible combinations of aspect ratios and resolutions that can be associated with video frames are considered to be within the scope of the present invention.

Returning to the exemplary video frame 400 illustrated in FIG. 4, one example of an identification scheme for pixels 410 is illustrated. Each pixel 410 in the video frame 400 can be identified by a coordinate 412 and 414, i.e., a pair of numbers that includes information about the position of the pixel in the video frame 400 relative to the other pixels 410 in video frame 400. As illustrated, each pixel is identified by a first number 412 that represents the horizontal row of pixels 410 in which the pixel is located and a second number 414 that represents the vertical column in which the pixel is located. Thus, for instance, the pixel located in the top-left corner of the illustrative video frame 400 is identified by the coordinate (1,1) because the pixel is in the first horizontal row and the first vertical column. Similarly, the pixel immediately below the pixel identified by (1,1) is identified by the coordinate (2,1) because it is in the second horizontal row and the first vertical column. In embodiments of the present invention, other schemes can be used to identify pixels in a video frame. In some embodiments, for example, a pixel is identified with reference to other pixels around it. In other embodiments, different components of the systems and methods described herein can use different techniques for identifying pixels.

Turning to FIG. 5, video frame 400 is illustrated and includes a border 512 of a region of interest. In embodiments, border 512 can include edges, curves, lines, and the like detected by an edge or feature detection module such as, for example, edge detection module 218 illustrated in FIG. 2. In other embodiments, border 512 can include a partially or completely user-defined region of interest border. Also, it should be understood that, although border 512 is illustrated as a dotted line in FIG. 5, a border around a region of interest can be represented as a solid line or curve. The border illustrated in FIG. 5 is shown as a dotted line only for the purpose of contrasting the border with the rest of the video frame 400 to facilitate understanding of the concepts discussed herein. As shown, border 512 encloses a region of interest 520 defined by pixels located in the middle six columns 514 and in the bottom eight rows 516. Therefore, the region of interest in video frame 400, as illustrated in FIG. 5 includes at least a portion of each of the following pixels: (3,4), (3,5), (3,6), (3,7), (4,4), (4,5), (4,6), (4,7), (5,3), (5,4), (5,5), (5,6), (5,7), (5,8), (6,3), (6,4), (6,5), (6,6), (6,7), (6,8), (7,3), (7,4), (7,5), (7,6), (7,7), (7,8), (8,3), (8,4), (8,5), (86), (8,7), (8,7), (8,8), (9,3), (9,4), (9,5), (9,6), (9,7), (9,8), (10,3), (10,4), (10,5), (10,6), (10,7), and (10,8). Thus the remaining pixels 518 correspond to the background of the video frame. In an embodiment, an encoder (i.e., codec) can inform a decoder (e.g., another codec) that it will be providing video frames having a particular format (e.g., resolution and aspect ratio) and that only those pixels identified as being within the region of interest will be sent. Accordingly, the decoder can prepare for decoding the video frame.

For example, with respect to the illustrative example of FIGS. 4-6, the encoder could provide an indication to a decoder that the video frame 400 will be presented encoded according to MPEG-4 standard, and that only those pixels within the region of interest will be encoded and sent. In other embodiments, as discussed above, the video frame 400 can include a simulated background, in which case all of the pixels 410 will be sent. Processing power can still be saved in this example, however, by including a simulated background which includes one solid color.

Referring again to FIG. 5, a feature mask can be generated that includes the border 512. It should be understood, however, that a feature mask typically will consist of a solid curve or line, rather than a dotted curve. The video frame 400 and the feature mask (e.g., see 512) can be sent to a cropping module that removes the background pixels 518 from the image to generate a cropped video frame 600, as illustrated in FIG. 6. As illustrated in FIG. 6, cropped video frame 600 includes only the region of interest 520. The background pixels 518 have been removed, leaving only those pixels included within the region of interest 520. In some embodiments, various smoothing, blending, combining, or other techniques can be used to smooth the edges of the region of interest 520. In other embodiments, the region of interest 520 is presented without smoothing the edges. Also as discussed above, the cropped video frame 600 can be overlayed on a simulated background (not illustrated in FIG. 6) to create a formatted video frame. The simulated background can contain images, colors, text, or anything else that can be displayed as part of a video frame. Processing burdens can be minimized in various embodiments by using simulated backgrounds consisting of, for example, single colors, a few colors with limited color gradient between them, black and white images, and the like.

Figure 7:
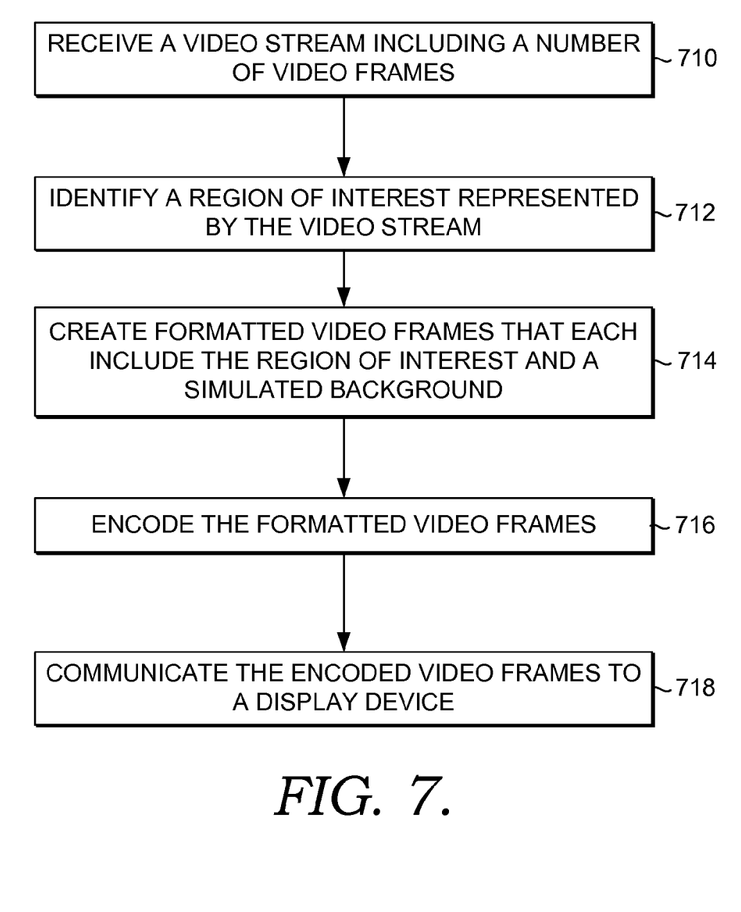
FIGS. 7 and 8 are flow diagrams showing illustrative methods of providing formatted video frames in accordance with an embodiment of the present invention.

To recapitulate, we have described systems and methods for providing formatted video frames that emphasize features, allowing for capture and transmission of high-quality video data while avoiding excessive processing burdens. Turning to FIG. 7, a flow diagram is provided, showing an illustrative method of providing a formatted video stream that emphasizes a region of interest. At a first illustrative step, step 710, a video stream is received. The video stream includes a number of video frames. At step 712, a region of interest represented by the video stream is identified. In embodiments, a region of interest can be identified for each frame of the video stream. In another embodiment, a region of interest can be initially determined using autonomous feature detection and edge detection techniques, with subsequent region of interest identification being performed by contextual techniques.

At step 714, formatted video frames are created that each include the region of interest and a simulated background. In other embodiments, the formatted video frames do not contain a simulated background, but rather include only the region of interest. At step 716, the formatted video frames are encoded and, as shown at step 718, the encoded frames are communicated to a display device.

Figure 8:
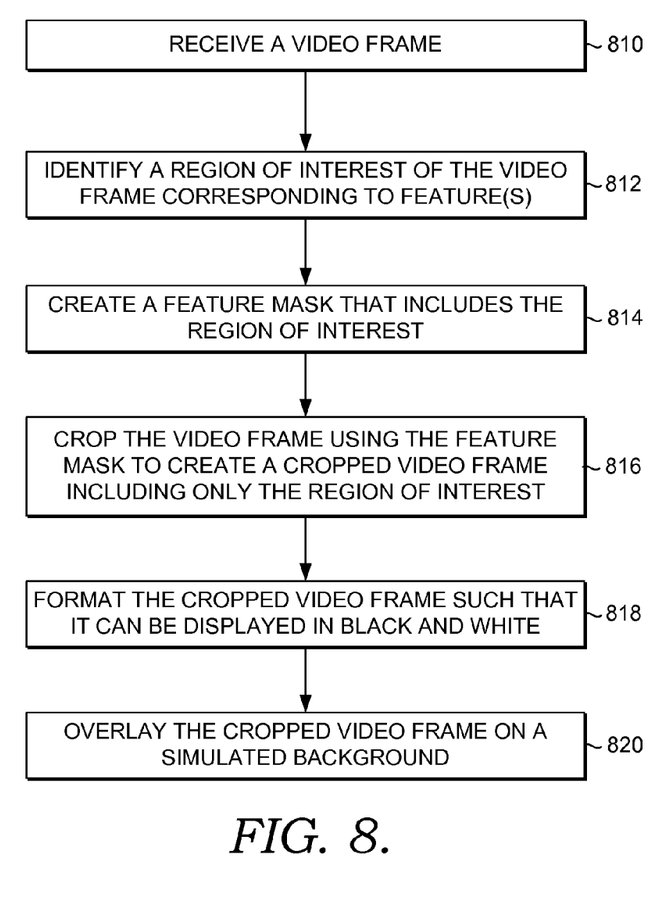

Turning now to FIG. 8, a flow diagram showing an illustrative method of formatting a video stream to isolate features is provided. At an illustrative initial step 810, a video frame is received. At step 812, a region of interest of the video frame is identified. In an embodiment, the region of interest includes or corresponds to one or more features that are to be emphasized. For example, in an embodiment, the features can include the hands and face of a user. In another embodiment the features may just include a user's face or some other object. In embodiments, the region of interest can be identified by any number of feature detection and/or edge detection techniques.

At step 814, a feature mask that includes the region of interest is created. The feature mask is used, at step 816, to create a cropped video frame by cropping the video frame such that only the region of interest remains. Further, the cropped video frame is formatted such that it can be displayed in black and white, as illustrated at step 818. At a final illustrative step 520, the cropped video frame is overlayed on a simulated background.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of providing a formatted video stream that emphasizes a region of interest, the method comprising:
receiving a video stream comprising a plurality of video frames;
identifying a region of interest represented by the video stream;
creating a plurality of formatted video frames by formatting each of the plurality of video frames using a feature mask of the region of interest, each of the plurality of formatted video frames comprising the region of interest overlaid on a simulated background;
encoding the plurality of formatted video frames; and
communicating the encoded plurality of formatted video frames to a display device such that the plurality of video frames can be displayed.

2. The media of claim 1, wherein identifying the region of interest comprises applying an edge-detection algorithm to each of the plurality of video frames.

3. The media of claim 1, wherein creating the plurality of formatted video frames comprises:
removing a background image from each of the plurality of video frames, the background image of each of the plurality of video frames comprising an image occupying a background region of each of the plurality of video frames, wherein the background region of each of the plurality of video frames comprises the portion of each of the plurality of video frames that does not include the region of interest; and
creating a simulated background by filling the background region of each of the plurality of video frames with a simulated background image.

4. The media of claim 3, wherein the simulated background image comprises a single color.

5. The media of claim 4, wherein the single color is blue.

6. The media of claim 1, wherein each of the plurality of video frames comprises an image of a person captured by a video capturing device.

7. The media of claim 6, wherein the region of interest comprises a region of each image comprising at least one of the person's hands and the person's face.

8. The media of claim 1, further comprising formatting the region of interest such that the region of interest can be displayed in black and white.

9. The media of claim 1, wherein encoding the plurality of formatted video frames comprises utilizing a standard video compression algorithm.

10. The media of claim 9, wherein the standard video compression algorithm generates a compressed video stream according to an MPEG format.

11. One or more non-transitory computer-readable media having computer-executable instructions embodied thereon for performing a method of formatting a video stream to isolate features, the method comprising:
receiving a video frame;
identifying a region of interest of the video frame that corresponds to one or more features;
creating a feature mask that comprises the region of interest;
cropping the video frame using the feature mask to create a cropped video frame comprising only the region of interest; and
overlaying the cropped video frame on a simulated background to create a formatted video frame.

12. The media of claim 11, wherein identifying the region of interest comprises applying an edge-detection algorithm to the video frame.

13. The media of claim 11, wherein cropping the video frame comprises removing a background from the video frame, the background comprising a background image occupying a background region of the video frame, wherein the background region comprises the portion of the video frame that does not include the region of interest.

14. The media of claim 13, wherein the simulated background comprises a simulated background image designed to occupy the background region of the video frame.

15. The media of claim 14, wherein the simulated background image comprises a single color.

16. The media of claim 11, further comprising formatting the cropped video frame such that the region of interest is configured to be displayed as a black and white image.

17. A system for formatting a video stream to isolate features, the system comprising:
a video driver that receives video frames from a video capturing device;
a video formatting component that:
(1) receives video frames from the video driver;
(2) identifies a region of interest of the video frames, generates a feature mask based on the identified region of interest;
(3) crops the video frames using the feature mask; and
(4) creates formatted video frames, each of the formatted video frames comprising the region of interest overlaid on a simulated background; and
a video codec for encoding the formatted video frames.

18. The system of claim 17, wherein the video formatting component comprises an edge detection module for identifying the region of interest and generating feature mask representing the region of interest.

19. The system of claim 18, wherein the video formatting component further comprises a cropping module for removing a background image from a video frame, wherein the background image comprises an image occupying a portion of the video frame that does not include the region of interest.

20. The system of claim 19, wherein the video formatting component further comprises a simulated background generation module that generates a simulated background for replacing the removed background image.

\* \* \* \* \*